US008280540B2

(12) United States Patent
Hsu et al.

(10) Patent No.: US 8,280,540 B2
(45) Date of Patent: Oct. 2, 2012

(54) MULTIMEDIA PLAYING SYSTEM AND TIME-COUNTING METHOD APPLIED THERETO

(75) Inventors: Shou-Hsiu Hsu, Taipei (TW); Kuo-Hsun Huang, Taipei (TW); Yi-Tse Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 758 days.

(21) Appl. No.: 12/425,239

(22) Filed: Apr. 16, 2009

(65) Prior Publication Data

US 2009/0287327 A1 Nov. 19, 2009

(30) Foreign Application Priority Data

May 15, 2008 (TW) .............................. 97117884 A

(51) Int. Cl.
*G06F 17/00* (2006.01)

(52) U.S. Cl. ........................................................ 700/94

(58) Field of Classification Search .................... 700/94; 455/3.06; 381/74, 309–311, 370–384
See application file for complete search history.

(56) References Cited

U.S. PATENT DOCUMENTS

2008/0144841 A1* 6/2008 Goldstein et al. ............... 381/56
2009/0245537 A1* 10/2009 Morin ........................... 381/107
2011/0144779 A1* 6/2011 Janse et al. ...................... 700/94

FOREIGN PATENT DOCUMENTS

| | | |
|---|---|---|
| CN | 2254194 | 5/1997 |
| CN | 1509120 | 6/2004 |
| JP | 2008066842 | 3/2008 |
| TW | 200605615 | 2/2006 |
| TW | 200803577 | 1/2008 |
| WO | WO 2007110807 A2 * | 10/2007 |

OTHER PUBLICATIONS

Machine Translation of JP 2008066842 A obtained from Japanese Patent Office website Jan. 17, 2012; publication date of Mar. 21, 2008.*

* cited by examiner

*Primary Examiner* — Andrew C Flanders
(74) *Attorney, Agent, or Firm* — Jianq Chyun IP Office

(57) ABSTRACT

A multimedia playing system includes an audio outputting device and a multimedia player. The audio outputting device includes a connecting plug and a distance detector. The distance detector generates a distance detecting signal if the distance detector detects the presence of a nearby object. The multimedia player is communicated with the audio outputting device through the connecting plug so as to transmit an output audio signal to the audio outputting device. The distance detecting signal is transmitted to the multimedia player through the connecting plug. The multimedia player generates a prompt event to the audio outputting device if the time duration of continuously receiving the distance detecting signal exceeds a time threshold.

18 Claims, 3 Drawing Sheets

MULTIMEDIA PLAYING SYSTEM AND TIME-COUNTING METHOD APPLIED THERETO

FIELD OF THE INVENTION

The present invention relates to a multimedia playing system, and more particularly to a multimedia playing system capable of calculating the time duration of using an audio outputting device. The present invention also relates to a time-counting method applied to the multimedia playing system.

BACKGROUND OF THE INVENTION

Nowadays, portable multimedia players such as MP3 players (MPEG-1 Audio Layer 3) become popular electronic devices in modern societies due to some advantages such as small size, light weightiness and easy portability. On account of their portability, the users can use such portable multimedia players everywhere they are. In order to hear songs from the portable multimedia player, some accessories such as earphones are indispensable. As known, the use of an earphone at a sufficiently high volume level may cause temporary or permanent hearing impairment. The extended period of using the earphone at improper intensity or frequency of the sound wave may be also damaging to the autonomic nerves of the user and thus reduce the sound discrimination capability or result in hearing loss. For preventing from the hearing damage during extended listening, some hearing experts advise the users to take a rest for at least 5~10 minutes after 30-minute period of using earphones to listen to songs.

For reminding the user of the total time period of playing songs, some manufacturers of portable multimedia players have attempted to display the total time period on the screens of the portable multimedia players or the toolbars of the player software. According to these designs, the users need to personally view the total time period in order to realize whether the total time period exceeds 30 minutes. In most situations when the users listen to songs by using earphones, the users frequently forget to keep an eye on the total time period and thus the users seldom take a rest after 30-minute period of using earphones to listen to songs. On the other hand, if the users listen to songs without using earphones, the total time period shown on the screens of the portable multimedia players or the toolbars of the player software is usually meaningless because the possibility of resulting in hearing loss is largely reduced.

SUMMARY OF THE INVENTION

The present invention relates to a multimedia playing system capable of calculating the time duration of using an audio outputting device.

The present invention also relates to a time-counting method applied to the multimedia playing system.

In accordance with an aspect of the present invention, there is provided a multimedia playing system. The multimedia playing system includes an audio outputting device and a multimedia player. The audio outputting device includes a connecting plug and a distance detector. The distance detector generates a distance detecting signal if the distance detector detects the presence of a nearby object. The multimedia player is communicated with the audio outputting device through the connecting plug so as to transmit an output audio signal to the audio outputting device. The distance detecting signal is transmitted to the multimedia player through the connecting plug. The multimedia player generates a prompt event to the audio outputting device if the time duration of continuously receiving the distance detecting signal exceeds a time threshold.

In accordance with another aspect of the present invention, there is provided a time-counting method for use with a multimedia playing system. The multimedia playing system includes an audio outputting device and a multimedia player. The time-counting method includes the steps of detecting whether the audio outputting device is communicated with the multimedia player, transmitting an output audio signal from the multimedia player to the audio outputting device if the audio outputting device is communicated with the multimedia player, generating a distance detecting signal if an object near the audio outputting device is detected; and generating a prompt event to the audio outputting device if the time duration of continuously receiving the distance detecting signal exceeds a time threshold.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
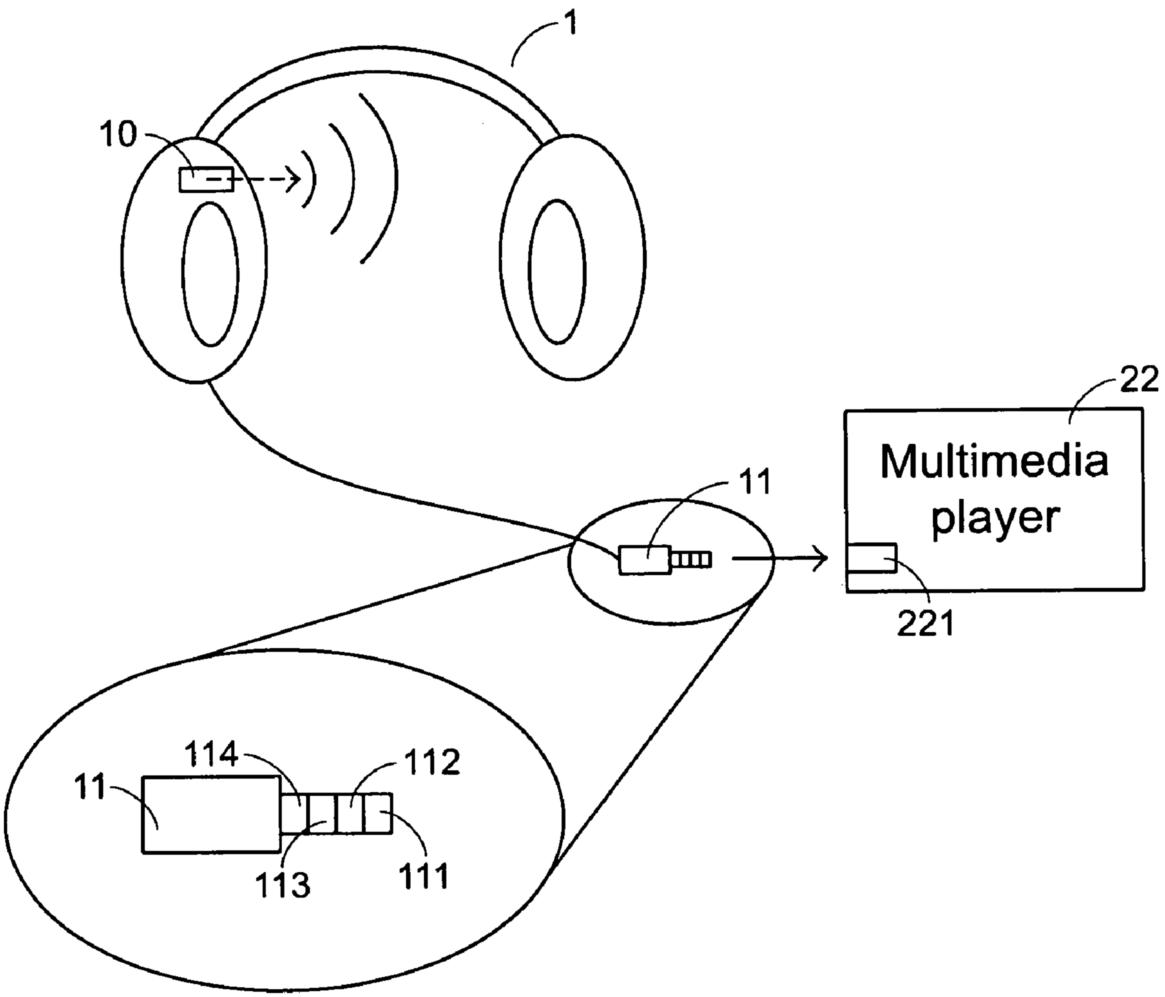
FIG. 1 schematically illustrates the configuration of a multimedia playing system according to a preferred embodiment of the present invention.

FIG. 1 schematically illustrates the configuration of a multimedia playing system according to a preferred embodiment of the present invention. As shown in FIG. 1, the multimedia playing system principally comprises an audio outputting device 1 and a multimedia player 22. The audio outputting device 1 comprises a distance detector 10, a sound emitter and a connecting plug 11. An example of the audio outputting device 1 includes but is not limited to an earphone. In a case that the audio outputting device 1 is an earphone, the sound emitter includes a right-side speaker and a left-side speaker of the earphone. Corresponding to the connecting plug 11, the multimedia player 22 has a jack 221. When the connecting plug 11 is inserted into the jack 221, the audio outputting device 1 is communicated with the multimedia player 22. At this moment, the output audio signals can be transmitted from the multimedia player 22 to the sound emitter of the audio outputting device 1 through the connecting plug 11, so that the output audio signals are emitted by the sound emitter.

In accordance with a key feature of the present invention, the distance detector 10 is a proximity sensor for detecting the distance between a nearby object and the distance detector 10. For example, the distance detector 10 continuously emits an infrared beam. By comparing the intensity of the original infrared beam with the intensity of the proximity object, the distance detector 10 may realize the distance between the nearby object and the distance detector 10. In a case that the nearby object is distant from the distance detector 10 within the length threshold (e.g. 2 cm), the distance detector 10 generates a distance detecting signal. If the earphone 1 is worn on the user's ears, the distance detector 10 will begin to generate the distance detecting signal because the user's ear is distant from the distance detector 10 within the length threshold. Once the distance detecting signal is generated, the distance detecting signal is transmitted to the multimedia player 22 through the connecting plug 11.

In this embodiment, the distance detector 10 is a proximity sensor that continuously emits an infrared beam. It is noted that, however, those skilled in the art will readily observe that numerous modifications and alterations may be made while retaining the teachings of the invention. For example, the distance detector 10 may emit an ultrasonic signal for detecting the distance between the nearby object and the distance detector 10. Alternatively, the distance detector 10 may be made of optical fibers.

Please refer to FIG. 1 again. The connecting plug 11 comprises four pins 111, 112, 113 and 114. The first pin 111 is a right channel pin. The second pin 112 is a left channel pin. The third pin 113 is a ground pin. The fourth pin 114 is a signal pin. The right-side speaker of the earphone 1 is electrically connected to the right channel pin 111 and the ground pin 113. The left-side speaker of the earphone 1 is electrically connected to the left channel pin 112 and the ground pin 113. Via the right channel pin 111 and the left channel pin 112 of the connecting plug 11, the output audio signals can be transmitted to the right-side speaker and the left-side speaker of the earphone 1. In addition, the distance detector 10 is electrically connected to the signal pin 114 and the ground pin 113. Via the signal pin 114 of the connecting plug 11, the distance detecting signal generated by the distance detector 10 can be transmitted to the multimedia player 22 and received by a microprocessor 222 of the multimedia player 22, as will be illustrated later.

The function of the signal pin 114 is not limited to transmission of the distance detecting signal. For example, in a case that the earphone 1 has an additional microphone (not shown) electrically connected to the signal pin 114, the low-frequency microphone signal generated by the microphone may be also transmitted to the multimedia player 22 through the signal pin 114. In order words, the high-frequency distance detecting signal and the low-frequency microphone signal may be transmitted to the multimedia player 22 through the signal pin 114. The high-frequency distance detecting signal and the low-frequency microphone signal are then distinguished and processed by related circuits of the multimedia player 22.

Figure 2:
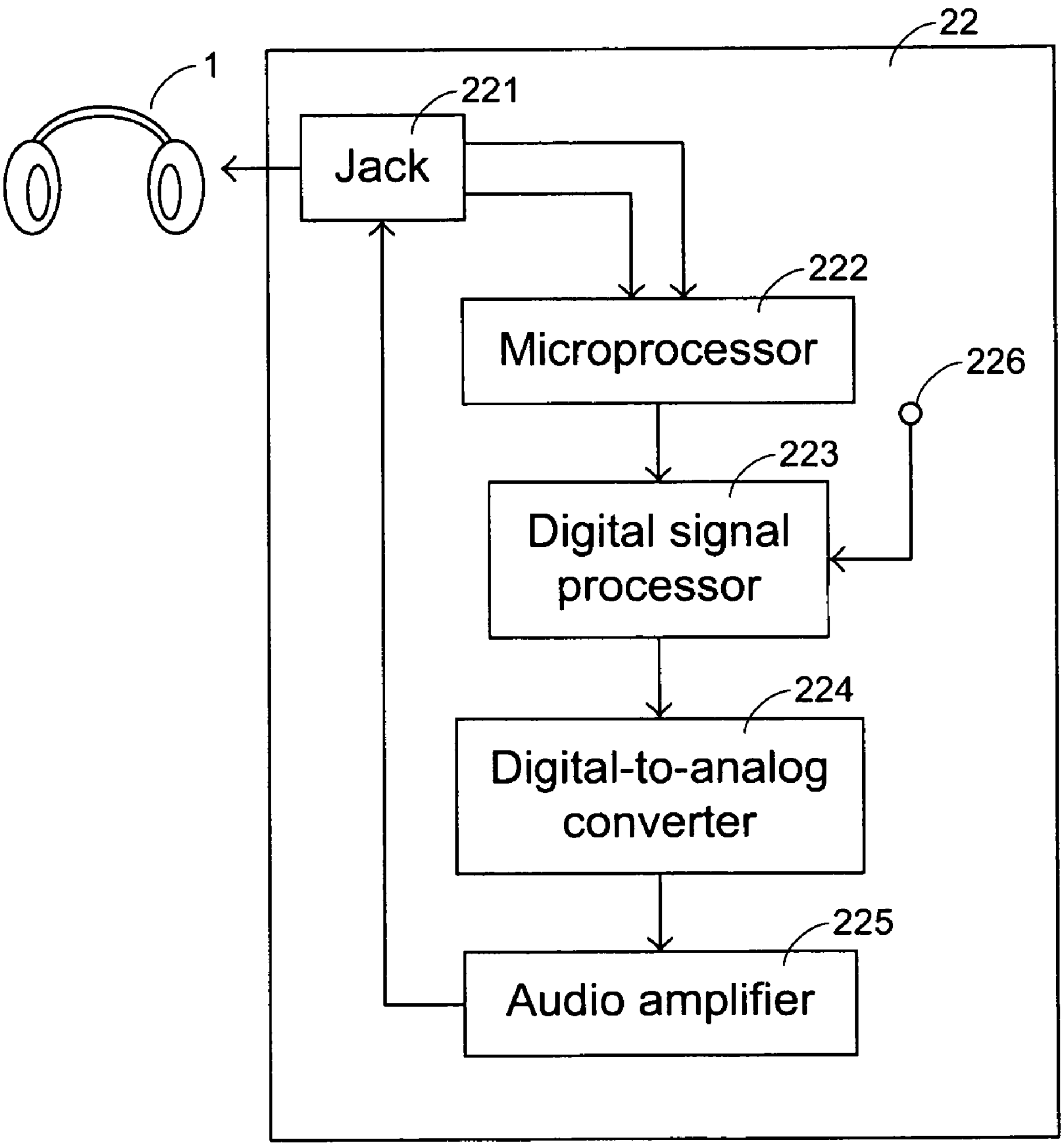
FIG. 2 is a schematic circuit block diagram illustrating a multimedia player of the multimedia playing system according to the present invention.

FIG. 2 is a schematic circuit block diagram illustrating a multimedia player of the multimedia playing system according to the present invention. As shown in FIG. 2, the multimedia player 22 comprises a jack 221, a microprocessor 222, a digital signal processor 223, a digital-to-analog converter 224, an audio amplifier 225 and an audio source 226. The jack 221 has a shape mating with the connecting plug 11 of the audio outputting device 1 so as to be coupled with the connecting plug 11. After the connecting plug 11 is coupled with the jack 221, the audio outputting device 1 and the multimedia player 22 are communicated with each other. The microprocessor 222 is electrically connected with the jack 221 for receiving the distance detecting signals transmitted from the distance detector 10. Once the multimedia player 22 plays the output audio signals, the microprocessor 222 begin to calculate the time duration of receiving the distance detecting signals. If the time duration of receiving the distance detecting signals exceeds a time threshold (e.g. 30 minutes), the microprocessor 222 issues a warming signal to the audio outputting device 1. The audio source 226 can provide a digital audio source signal. The digital signal processor 223 is electrically connected to the microprocessor 222 and the audio source 226 for processing the digital audio source signal. By the digital-to-analog converter 224, the digital audio source signal after being processed by the digital signal processor 223 is converted into an analog audio source signal. The audio amplifier 225 is electrically connected to the digital-to-analog converter 224 and the jack 221 for amplifying the analog audio source signal as an output audio signal. The output audio signal is then transmitted to the audio outputting device 1 through the jack 221.

Generally, the natural sounds are analog signals. For storage, the analog audio source signals need to be converted into digital audio source signals. For playing the output audio signals, the digital audio source signals provided by the audio source 226 are processed by the digital signal processor 223 and then converted into analog audio source signals by the digital-to-analog converter 224. The analog audio source signals are amplified by the audio amplifier 225 as output audio signals.

The microprocessor 222 is a core component of the multimedia player 22 for controlling operations of the multimedia player 22. When the playback key (not shown) of the multimedia player 22 is triggered, the microprocessor 222 discriminates whether the connecting plug 11 of the audio outputting device 1 is electrically connected to the jack 221 according to the impedance value of the connecting plug 11. For example, when the connecting plug of an earphone is inserted into the jack 221, the impedance value is ranged from 16 to 32 ohms. Moreover, according to the impedance value, the microprocessor 222 may identify which kind of audio outputting device is connected to the multimedia player 22. After the audio outputting device 1 is connected to the multimedia player 22 and the nearby object (e.g. the user's ear) is distant from the distance detector 10 of the audio outputting device 1 within the length threshold (e.g. 2 cm), distance detecting signals are continuously transmitted to the microprocessor 222 of the multimedia player 22 through the connecting plug 11. Meanwhile, the microprocessor 222 begins to calculate the time duration of receiving the distance detecting signals. If the time duration of receiving the distance detecting signals exceeds a time threshold (e.g. 30 minutes), the microprocessor 222 generates a prompt event. The prompt event includes for example adjusting the sound volume down or adding a warming signal, thereby notifying the user that he or she needs to stop listening to the output audio signal but take a rest.

In some embodiments, in a case that an earphone having an additional microphone (not shown) is used as audio outputting device 1, the high-frequency distance detecting signal and the low-frequency microphone signal are transmitted to the multimedia player 22 through the same signal pin 114. The microprocessor 222 may further include a filter to distinguish the high-frequency distance detecting signal from the low-frequency microphone signal. As a consequence, the high-frequency distance detecting signal and the low-frequency microphone signal are separately processed by the microprocessor 222.

Figure 3:
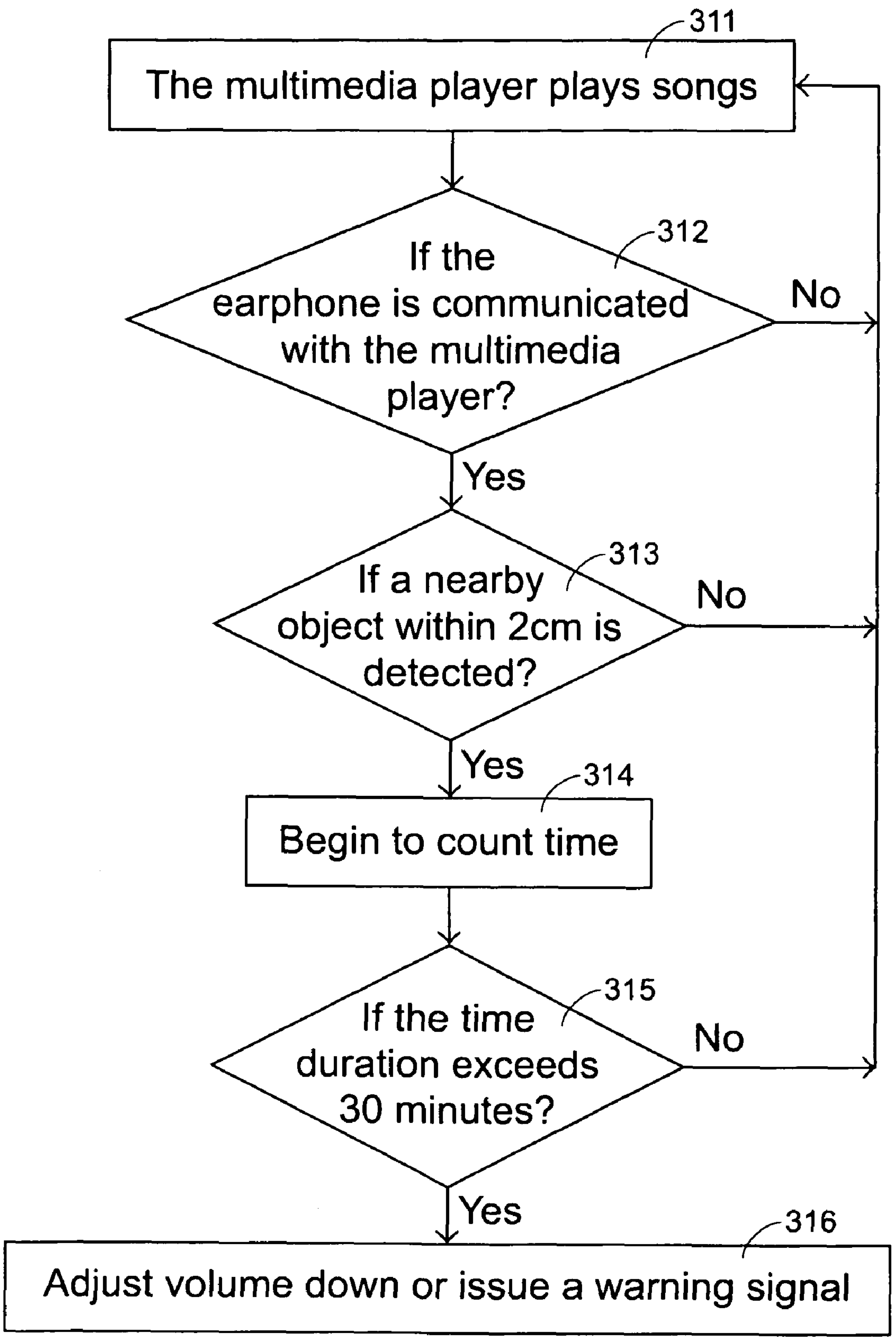
FIG. 3 is a flowchart illustrating a time-counting method applied to the multimedia playing system of the present invention.

FIG. 3 is a flowchart illustrating a time-counting method applied to the multimedia playing system of the present invention. In this embodiment, the output audio signals played by the multimedia player 22 are songs, and the audio outputting device 1 is an earphone. When the playback key of the multimedia player 22 is triggered to play songs (Step 311), the microprocessor 222 will discriminate whether the earphone 1 is communicated with the multimedia player 22 according to the detected impedance value (Step 312). If the earphone 1 is communicated with the multimedia player 22, the distance detector 10 will detect the distance between the nearby object (e.g. the user's ear) and the distance detector 10. If the user's ear is distant from the distance detector 10 within the length threshold (e.g. 2 cm) (Step 313), the distance detector 10 transmits a distance detecting signal to the microprocessor 222 of the multimedia player 22 through the connecting plug 11 and the jack 221. In other words, when the distance detecting signal is received by the microprocessor 222, the microprocessor 222 discriminates that the nearby object is detected by the distance detector 10 and thus the microprocessor 222 begin to count time (Step 314). If the distance detecting signals are continuously to the microprocessor 222, the microprocessor 222 will calculate the time duration of receiving the distance detecting signals. If the time duration of receiving the distance detecting signals exceeds a time threshold (e.g. 30 minutes), the microprocessor 222 will adjust the sound volume down or issue a warming signal to notify the user that he or she needs to stop listening to the songs but take a rest (Step 316).

On the other hand, if the earphone 1 is disconnected from the multimedia player 22 (Step 312), the multimedia player 22 may continuously play the songs because no earphone is used to listen to the songs at this moment. In addition, if the distance between the user's ear and the distance detector 10 exceeds the length threshold (e.g. 2 cm) (Step 313), the multimedia player 22 may also continuously play the songs because the earphone is possibly detached from the user's ears. Similarly, if the time duration of receiving the distance detecting signals is below the time threshold (e.g. 30 minutes), the multimedia player 22 may also continuously play the songs because the adverse influence of using the earphone to listen to the songs is tiny.

From the above description, the multimedia playing system of the present invention is capable of counting the time duration when the user actually listens to songs by the earphone. In addition, the multimedia playing system can issue a warming signal to notify the user that he or she needs to stop listening to the songs but take a rest.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multimedia playing system, comprising:

an audio outputting device comprising a connecting plug and a distance detector, wherein the distance detector generates a distance detecting signal if the distance detector detects the presence of a nearby object; and a multimedia player, communicating with the audio outputting device through the connecting plug so as to transmit an output audio signal to the audio outputting device, receiving the distance detecting signal through the connecting plug so as to start counting a time period of continuously receiving the distance detecting signal, generating a prompt event to the audio outputting device if the time duration of continuously receiving the distance detecting signal exceeds a time threshold, and adjusting down the volume of the output audio signal according to the prompt event.

2. The multimedia playing system according to claim 1 wherein a warning signal is added to the output audio signal according to the prompt event.

3. The multimedia playing system according to claim 1 wherein the audio outputting device is an earphone.

4. The multimedia playing system according to claim 1 wherein the time threshold is 30 minutes.

5. The multimedia playing system according to claim 1 wherein the distance detector is an infrared proximity sensor, an ultrasonic proximity sensor or an optical fiber proximity sensor.

6. The multimedia playing system according to claim 1 wherein the distance detecting signal is generated if a distance between the nearby object and the distance detector is shorter than a length threshold.

7. The multimedia playing system according to claim 6 wherein the length threshold is 2 centimeters.

8. The multimedia playing system according to claim 1 wherein the multimedia player further comprises:

a jack mating with the connecting plug;

a microprocessor electrically connected to the jack, receiving the distance detecting signal, wherein the microprocessor generates the prompt event to the audio outputting device if the time duration of continuously receiving the distance detecting signal exceeds the time threshold;

an audio source providing a digital audio source signal;

a digital signal processor electrically connected to the microprocessor and the audio source, processing the digital audio source signal;

a digital-to-analog converter, converting the digital audio source signal into an analog audio source signal; and an audio amplifier electrically connected to the digital-to-analog converter and the jack, amplifying the analog audio source signal as an output audio signal.

9. A time-counting method, using with a multimedia playing system, the multimedia playing system comprising an audio outputting device and a multimedia player, the time-counting method comprising steps of:

detecting whether the audio outputting device is communicated with the multimedia player;

transmitting an output audio signal from the multimedia player to the audio outputting device if the audio outputting device is communicated with the multimedia player;

generating a distance detecting signal if an object near the audio outputting device is detected;

starting to count a time duration of continuously receiving the distance detecting signal;

generating a prompt event to the audio outputting device if the time duration of continuously receiving the distance detecting signal exceeds a time threshold; and adjusting down the volume of the output audio signal according to the prompt event.

10. The time-counting method according to claim 9 wherein the multimedia player continuously issues the output audio signal in the situation that the audio outputting device is disconnected from the multimedia player, no distance detecting signal is generated or the time duration of continuously receiving the distance detecting signal is below the time threshold.

11. The time-counting method according to claim 9 further comprising a step of adding a warning signal to the output audio signal according to the prompt event.

12. The time-counting method according to claim 9 wherein the audio outputting device is an earphone.

13. The time-counting method according to claim 9 wherein the time threshold is 30 minutes.

14. The time-counting method according to claim 9 wherein the audio outputting device has a distance detector for detecting a distance between the object and the audio outputting device and generating the distance detecting signal.

15. The time-counting method according to claim 14 wherein the distance detector is an infrared proximity sensor, an ultrasonic proximity sensor or an optical fiber proximity sensor.

16. The time-counting method according to claim 9 wherein the distance detecting signal is generated if a distance between the object and the audio outputting device is shorter than a length threshold.

17. The time-counting method according to claim 16 wherein the length threshold is 2 centimeters.

18. A multimedia playing system, comprising:

an audio outputting device comprising a connecting plug and a distance detector, wherein the distance detector generates a distance detecting signal if the distance detector detects the presence of a nearby object; and a multimedia player, communicating with the audio outputting device through the connecting plug so as to transmit an output audio signal to the audio outputting device, receiving the distance detecting signal through the connecting plug so as to start counting a time period of continuously receiving the distance detecting signal, and generating a prompt event to the audio outputting device if the time duration of continuously receiving the distance detecting signal exceeds a time threshold.

* * * * *